(12) United States Patent
Trenkle et al.

(10) Patent No.: US 12,339,354 B2
(45) Date of Patent: Jun. 24, 2025

(54) METHOD FOR IDENTIFYING AND CLASSIFYING OBJECTS, AND MOTOR VEHICLE

(71) Applicant: Brose Fahrzeugteile SE & Co. Kommanditgesellschaft, Bamberg, Bamberg (DE)

(72) Inventors: Christopher Trenkle, Bamberg (DE); Carsten Topf, Schonungen (DE); Julian Adametz, Nuremberg (DE); Benjamin Grünewald, Hassfurt / Augsfeld (DE); Wolfgang Uebel, Weitramsdorf (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 179 days.

(21) Appl. No.: 17/924,731

(22) PCT Filed: Apr. 9, 2021

(86) PCT No.: PCT/EP2021/059284
§ 371 (c)(1),
(2) Date: Nov. 11, 2022

(87) PCT Pub. No.: WO2021/228475
PCT Pub. Date: Nov. 18, 2021

(65) Prior Publication Data
US 2023/0184930 A1    Jun. 15, 2023

(30) Foreign Application Priority Data

May 12, 2020    (DE) .................... 10 2020 205 952.7

(51) Int. Cl.
*G01S 13/931*    (2020.01)
*E05F 15/42*    (2015.01)
(Continued)

(52) U.S. Cl.
CPC ............ *G01S 13/931* (2013.01); *G01S 13/32* (2013.01); *E05F 2015/433* (2015.01);
(Continued)

(58) Field of Classification Search
CPC ........ G01S 13/04; G01S 13/32; G01S 13/282; G01S 13/931; G01S 17/04; G01S 17/10;
(Continued)

(56) References Cited

U.S. PATENT DOCUMENTS 4,458,446 A     7/1984   Mochida et al.
9,831,881 B2 *  11/2017  Josefsberg ............. H03L 7/085
(Continued)

FOREIGN PATENT DOCUMENTS

CN    110469227 A  *  11/2019  .......... E05C 17/006
CN    113412361 A  *  9/2021
(Continued)

OTHER PUBLICATIONS

L. Zhaohua and G. Bochao, "Radar Sensors in Automatic Driving Cars," 2020 5th International Conference on Electromechanical Control Technology and Transportation (ICECTT), Nanchang, China, 2020, pp. 239-242, doi: 10.1109/ICECTT50890.2020.00061 (https://ieeexplore.ieee.org/document/9237588) (Year: 2020).*
(Continued)

*Primary Examiner* — Atul Trivedi
(74) *Attorney, Agent, or Firm* — Dickinson Wright PLLC

(57) ABSTRACT

A method for identifying and classifying objects in the surroundings of a motor vehicle, which method uses merely a single sensor for object detection. The method is characterized in that this single sensor moves in space while the object is being detected. In this case, during the measurement, the single sensor would act to a certain extent like a second sensor. The echo signals, reflected by the object, of different measurement cycles can be used to determine the
(Continued)

differential speed, distance and angle. The method provides the possibility of being able to classify, by means of a single sensor, objects and items in the surroundings of a motor vehicle in terms of their size.

20 Claims, 4 Drawing Sheets

(51) Int. Cl.
*E05F 15/43* (2015.01)
*E05F 15/611* (2015.01)
*G01S 13/32* (2006.01)

(52) U.S. Cl.
CPC ... *E05F 2015/434* (2015.01); *E05F 2015/483* (2015.01); *E05F 15/611* (2015.01); *E05Y 2201/434* (2013.01); *E05Y 2400/44* (2013.01); *E05Y 2400/54* (2013.01); *E05Y 2900/531* (2013.01); *G01S 2013/93274* (2020.01)

(58) Field of Classification Search
CPC ............ G01S 2013/93274; E05F 15/43; E05F 15/611; E05F 2015/433; E05F 2015/434; E05F 2015/483; E05F 2015/432; E05Y 2201/434; E05Y 2400/44; E05Y 2400/54; E05Y 2900/531; E05Y 2201/68; E05Y 2600/46
USPC .......................................................... 701/49
See application file for complete search history.

(56) References Cited

U.S. PATENT DOCUMENTS

| | | | |
|---|---|---|---|
| 2010/0104199 A1 | 4/2010 | Zhang et al. | |
| 2014/0207344 A1* | 7/2014 | Ihlenburg | E05F 15/73 701/49 |
| 2015/0009062 A1* | 1/2015 | Herthan | G01S 13/88 342/70 |
| 2017/0030737 A1* | 2/2017 | Elie | E05F 15/73 |
| 2017/0032599 A1* | 2/2017 | Elie | G07C 9/32 |
| 2017/0152698 A1* | 6/2017 | Bae | E05F 15/73 |
| 2017/0234054 A1* | 8/2017 | Kumar | E05F 15/73 49/324 |
| 2017/0247926 A1* | 8/2017 | Elie | E05F 15/40 |
| 2017/0247927 A1* | 8/2017 | Elie | B60Q 9/00 |
| 2017/0247933 A1* | 8/2017 | Elie | E05F 15/40 |
| 2017/0268280 A1* | 9/2017 | Kim | B60W 30/08 |
| 2018/0144496 A1 | 5/2018 | Posner et al. | |
| 2018/0238099 A1* | 8/2018 | Schatz | E05F 15/40 |
| 2019/0112858 A1* | 4/2019 | Partsch | E05F 15/43 |
| 2019/0128040 A1* | 5/2019 | Mitchell | E05F 15/43 |
| 2019/0137622 A1* | 5/2019 | Lopez-Hinojosa | G01S 13/867 |
| 2019/0139411 A1* | 5/2019 | Dhull | B60Q 1/507 |
| 2019/0162010 A1* | 5/2019 | Rafrafi | G01S 7/417 |
| 2019/0162821 A1* | 5/2019 | Rafrafi | B60Q 1/503 |
| 2019/0162822 A1* | 5/2019 | Rafrafi | G01S 13/56 |
| 2019/0187250 A1* | 6/2019 | Ru | G01S 7/4052 |
| 2019/0302259 A1* | 10/2019 | Van Fleet | G01S 15/8997 |
| 2019/0370975 A1 | 12/2019 | Kusari | |
| 2020/0018111 A1* | 1/2020 | Akbarian | E05F 15/40 |
| 2020/0033885 A1* | 1/2020 | Kim | G01S 13/931 |
| 2020/0300027 A1* | 9/2020 | Brown | B60N 2/0028 |
| 2021/0214989 A1* | 7/2021 | Linden | E05F 15/40 |
| 2021/0286923 A1* | 9/2021 | Kristensen | G01S 7/412 |
| 2022/0153262 A1* | 5/2022 | Gallo | G01S 7/417 |
| 2022/0203892 A1* | 6/2022 | Ma | B60R 1/22 |
| 2023/0065657 A1* | 3/2023 | Weston | E05F 15/73 |
| 2023/0145218 A1* | 5/2023 | Murray | G01S 13/931 701/24 |
| 2023/0236314 A1* | 7/2023 | Jin | G01S 7/356 342/70 |
| 2024/0096102 A1* | 3/2024 | Popov | G06V 20/56 |
| 2024/0191554 A1* | 6/2024 | Seok | E05F 15/43 |

FOREIGN PATENT DOCUMENTS

| | | | | |
|---|---|---|---|---|
| CN | 113417537 A | * | 9/2021 | |
| CN | 112083419 B | * | 12/2023 | ............. B60Q 9/004 |
| DE | 102009042863 A1 | * | 4/2010 | ............. E05C 17/00 |
| DE | 102009039619 A1 | | 3/2011 | |
| DE | 102010044219 A1 | * | 5/2012 | ......... B60K 31/0008 |
| DE | 112013004908 T5 | | 6/2015 | |
| DE | 102014011121 A1 | * | 1/2016 | ........... G01S 13/931 |
| DE | 202016103658 U1 | * | 9/2016 | ............. B60J 5/047 |
| DE | 202016103746 U1 | * | 10/2016 | ............. B60J 5/047 |
| DE | 202016103855 U1 | * | 11/2016 | ............... B60J 5/00 |
| DE | 202017100898 U1 | * | 4/2017 | ............. E05F 15/40 |
| DE | 202017100923 U1 | | 4/2017 | |
| DE | 102017103445 A1 | * | 8/2017 | ........... B60J 5/0472 |
| DE | 102016220084 A1 | * | 4/2018 | |
| DE | 102019108927 A1 | * | 10/2019 | ............... B60J 5/04 |
| DE | 102019130857 A1 | * | 5/2020 | ............. B60Q 1/323 |
| DE | 102020107962 A1 | * | 9/2020 | ............. B60J 5/047 |
| DE | 102020201999 A1 | * | 8/2021 | |
| DE | 102021117874 A1 | * | 1/2023 | ............. E05F 15/43 |
| EP | 2455250 A1 | * | 5/2012 | ......... B60K 31/0008 |
| EP | 3219563 A1 | * | 9/2017 | ............... B60J 5/10 |
| FR | 3120019 A1 | * | 8/2022 | ............. E05F 15/40 |
| JP | 2010133200 A | | 6/2010 | |
| KR | 20170108643 A | * | 9/2017 | |
| KR | 102029584 B1 | * | 10/2019 | |
| KR | 102040051 B1 | * | 11/2019 | |
| KR | 20220025599 A | * | 3/2022 | |
| WO | WO-2017040758 A1 | * | 3/2017 | ............. E05F 15/40 |
| WO | WO-2017172999 A1 | * | 10/2017 | ............. E05F 15/40 |

OTHER PUBLICATIONS

G. Gurav and P. Balakrishnan, "Obstacle Collision Warning Using Ultrasonic and LiDAR Sensor Fusion," 2023 IEEE 11th Region 10 Humanitarian Technology Conference (R10-HTC), Rajkot, India, 2023, pp. 47-52, doi: 10.1109/R10-HTC57504.2023.10461728 ( https://ieeexplore.ieee.org/document/10461728) (Year: 2023).*

Zhaohua, et al., "Radar Sensors in Automatic Driving Cars," 2020 5th International Conference on Electromechanical Control Technology and Transportation (ICECTT), Nanchang, China, 2020, pp. 239-242, doi: 10.1109/ICECTT50890.2020.00061. (https://ieeexplore.ieee.org/document/9237588) (Year: 2020).*

Gurav, et al., "Obstacle Collision Warning Using Ultrasonic and LiDAR Sensor Fusion, " 2023 IEEE 11th Region 10 Humanitarian Technology Conference (R10-HTC), Rajkot, India, 2023, pp. 47-52, doi: 10.1109/R10-HTC57504.2023.10461728. (https://ieeexplore.ieee.org/document/10461728) (Year: 2023).*

\* cited by examiner

METHOD FOR IDENTIFYING AND CLASSIFYING OBJECTS, AND MOTOR VEHICLE

CROSS-REFERENCE TO RELATED APPLICATIONS

This application is the U.S. National Phase of PCT Application No. PCT/EP2021/059284 filed on Apr. 9, 2021, which claims priority to German Patent Application No. DE 10 2020 205 952.7, filed on May 12, 2020, the disclosures of which are hereby incorporated in their entirety by reference herein.

TECHNICAL FIELD

The present disclosure relates to a method of detecting and classifying objects in the surrounding of a motor vehicle.

BACKGROUND

In automotive technology, radar sensors are being employed since long in order to detect the surroundings, such as obstacles, objects or other road users. Such sensors for detection of the surroundings are employed, for example, in order to monitor the opening process of motor-driven vehicle doors. The present invention and the problem related thereto are explained in the following by way of example with reference to collision avoidance in the automated opening of vehicle side doors, without, however, limiting the invention to this application.

Upon detection of the surroundings, a radar sensor emits radar radiation which is reflected by an object. From the reflected, so-called echo signal, the distance to the object and the detection angle, and possibly also the speed of the object, may then be derived in a manner which is known per se. By means of an appropriate tracking process, the relative speed may also be determined, i.e. the movement path and the speed of the object relative to the radar sensor or the corresponding vehicle door. It is essential that a sufficiently fine resolution is available for measuring the distance or detecting the angle. By means of such sensors for detection of the surroundings, objects in the surroundings of the vehicle may be classified with regard to their size and spatial extent.

A difficulty associated with this type of classification is the distinction between the respective types of objects, i.e. the distinction between the type, shape and composition of the objects to be detected. For example, there are more or less point-shaped objects, such as parts protruding in space, e.g. a bicycle handlebar, a part protruding from a wall, a protruding branch, etc. On the other hand, there are also flat objects. On the other hand, there are also two-dimensional, spatially extended objects, such as a wall, the body of another vehicle, etc.

SUMMARY

One or more objects of the present disclosure is to provide a simplified wave-based facility of classifying objects with respect to their size.

Accordingly, there is provided:

A method of detecting and classifying an object in the surroundings of a motor vehicle, at which vehicle an object in the surroundings of the motor vehicle is detected by means of a sensor in or on the motor vehicle, which sensor emits active radiation, and which object is classified with respect to its spatial extent, wherein the sensor is moved relative to the object from one measurement cycle to at least one subsequent measurement cycle, and wherein the echo signals reflected at the object as a result of the various measurement cycles are recorded, and wherein the information contained in the recorded echo signals are statistically evaluated.

A method of detecting and classifying objects in the surroundings of a motor vehicle, at which vehicle an active radiation is emitted by means of a sensor for a plurality of successive measurement cycles, and wherein the corresponding echo radiation reflected by the object is recorded; at which vehicle the sensor is moved relative to the object after each measurement cycle; at which vehicle the echo radiation recorded during each measurement cycle is evaluated using statistical methods; and at which vehicle the object is classified on the basis of the statistical evaluation.

A motor vehicle which has at least one vehicle door, wherein the at least one vehicle door is equipped with at least one sensor device which sensor device has a radar sensor and an evaluation device which are configured in such a way as to carry out a method according to the invention.

One or more principles on which the present disclosure is based is the fact that at least two sensors are generally required to detect an object—or alternatively one sensor is required having several antennas for a large angular resolution and the information obtained from these sensors or antennas are taken into account with one another.

The conception of the present invention is such that the second sensor may preferably be dispensed with, i.e. that only a single sensor with a comparatively very small number of antennas is sufficient for object detection, provided that this single sensor moves in space during detection. In this case, this single sensor would in principle have the function of a second sensor.

The method according to the present disclosure thus provides the facility to classify objects and items in the surroundings of a motor vehicle with regard to their size, preferably by means of a single sensor. This makes it possible to provide a simpler and thus also more cost-effective device for classifying objects/items in the surroundings of a motor vehicle.

In another embodiment, the sensor is a radar sensor emitting radar radiation. Such a radar sensor may include a transmitting device for emitting radar beams. In addition, the radar sensor also may include a receiving device (e.g. a receiving antenna) by means of which receiving device the radar radiation emitted by the radar sensor, which is reflected by an object in the surroundings as echo radiation, is received again.

As an example, an FMCW radar sensor (FMCW: frequency modulated continuous wave) is employed. Such contactless radar devices work on the basis of frequency-modulated radar radiation, in which the Doppler effect is employed to measure distance and speed. Each measurement takes place within a measurement cycle that typically lasts less than 100 msec.

Within this measurement cycle, a measurement can take place, i.e. the ramp of the reflected and recorded measurement signal is sampled and is FFT-transformed for further evaluation.

In another embodiment, other measuring principles based on the reflection of radiated waves, such as ultrasound-based measuring sensors, could also be employed. In addition, LIDAR distance measurement would also be possible. Such LIDAR systems are wave-based measuring systems in which laser pulses are emitted and the backscattered light is recorded. From the light travelling time of the signals, i.e. the time between the emission of the laser pulses and the reception of the backscattered light signals, the distance to the location of the scattering and thus the obstacle may be calculated.

According to yet another embodiment, the only sensor is a component of a vehicle door. The vehicle door may be in the form of a side door, tailgate, sliding door or the like. It is only essential that the sensor is arranged in or on the vehicle door in such a way that the sensor is moved relative to the object to be detected, and is thus moved relative to the surroundings of the vehicle door during an opening and/or closing process of the vehicle door. It is the best way to accomplish this if the sensor is placed as far away as possible from the axis of rotation of the vehicle door in order to enable a defined relative movement to the object. As an example, the sensor is integrated in or attached to a door handle, as the door handle is usually sufficiently far away from the axis of rotation of the side door, and thus classification is possible due to this arrangement even at low opening angles. Additionally or alternatively, the sensor may also be integrated in a cover, or may be arranged behind the cover. Such a cover may be, for example, a trim strip, a cover of an A, B or C pillar, a sealing lip, for example for the window pane. It is essential that the sensor is positioned in such a way so that the sensor is located on a moving, known path.

In another embodiment, a feature vector is determined from the information contained in the recorded echo signals. This feature vector may then be statistically evaluated and employed for classification. The numerical parameters for the feature vector are extracted from the information of the recorded echo signals. Object identification by classification of features is a pattern recognition technique that is employed to categorize a large amount of data and information into different classes. For the classification, a set of numerical features is defined by a feature vector. Algorithms for classification from a feature vector include nearest neighbor classification, neural networks (such as deep learning), statistical methods (such as machine learning).

In another embodiment, an object detected by means of the emitted active radiation is classified over time using an appropriate tracking algorithm.

According to yet another embodiment, the determined feature vector is compared with a first feature vector and a second feature vector in order to classify the object. The first feature vector represents an ideal pole, such as a point-like obstacle, wherein the second feature vector represents an ideal wall. Depending on the comparison, the object is classified as a wall or a pole. In this way, a two-class classification is provided.

In yet another embodiment, a distance of the determined feature vector to the calculated first feature vector and to the calculated second feature vector is calculated for the comparison. In this two-class classification, the object whose feature vector has the smallest distance to the determined feature vector is selected for classification. The distinction of at least two structurally different obstacles alone may avoid unnecessary collisions with obstacles that are difficult to detect and are unpleasant for the user.

According to a further embodiment, the object is classified neither as an ideal pole nor as an ideal wall if the calculated distances exceed a predetermined distance. This is especially the case if the object to be detected has no resemblance to either an ideal pole or an ideal wall, and if the object to be detected is not even stationary, such as in the case of a hedge or the like. In the case of such diffuse, not clearly detectable objects, the distance of the feature vector determined for this purpose to the first and second feature vector would be too large. In this way, the method according to the invention is thus extended to a three-class classification.

Typically, a Euclidean distance and, as another example, a weighted Euclidean distance between the feature vectors is calculated upon calculation of the distance.

In other embodiments, a measured or determined feature vector includes at least one of the following information:
Time change of the calculated orientation of the object;
maximum angle of change;
total distance travelled during the measurement cycles averaged over the required time;
differential path from one measurement cycle to the subsequent measurement cycle.

According to a further embodiment, the sensor is a component of a vehicle door. During an opening process of the vehicle door, a detection of the surroundings is carried out, wherein a warning signal is emitted if an imminent collision of the vehicle door with the object is detected on the basis of the surroundings information detected by the sensor. The warning signal may be an acoustic and/or optical warning signal. In the event of a detected impending collision, further collision-avoiding measures may also be initiated, such as blocking the opening process, for example by means of a corresponding motorized drive for automated opening. The motorized drive may be advantageous for vehicle doors that may be opened motor-driven. If the user confirms the opening process despite the warning, e.g. by pressing a button on the remote control or on the HMI (Human-Machine-Interface), the door may continue to open, wherein the responsibility in the event of a possible subsequent collision is transferred to the user.

The door of the motor vehicle may be designed as a side door, sliding door, tailgate, boot lid or the like. Of course, it would also be conceivable to use the sensor in combination with other vehicle components which are openable and closable such as covers or sliding doors.

The above embodiments and further improvements may be combined with each other as long as it makes any sense. Further possible embodiments, further improvements and implementations of the invention also include combinations of features of the invention described above or below with respect to the exemplary embodiments which are not explicitly mentioned. As an example, the skilled person might also add single aspects as improvements or additions to the respective basic implementation of the present invention.

BRIEF DESCRIPTION OF THE DRAWINGS

The present disclosure is explained in more detail below with reference to the embodiments shown in the schematic figures, wherein.

Figure 1:
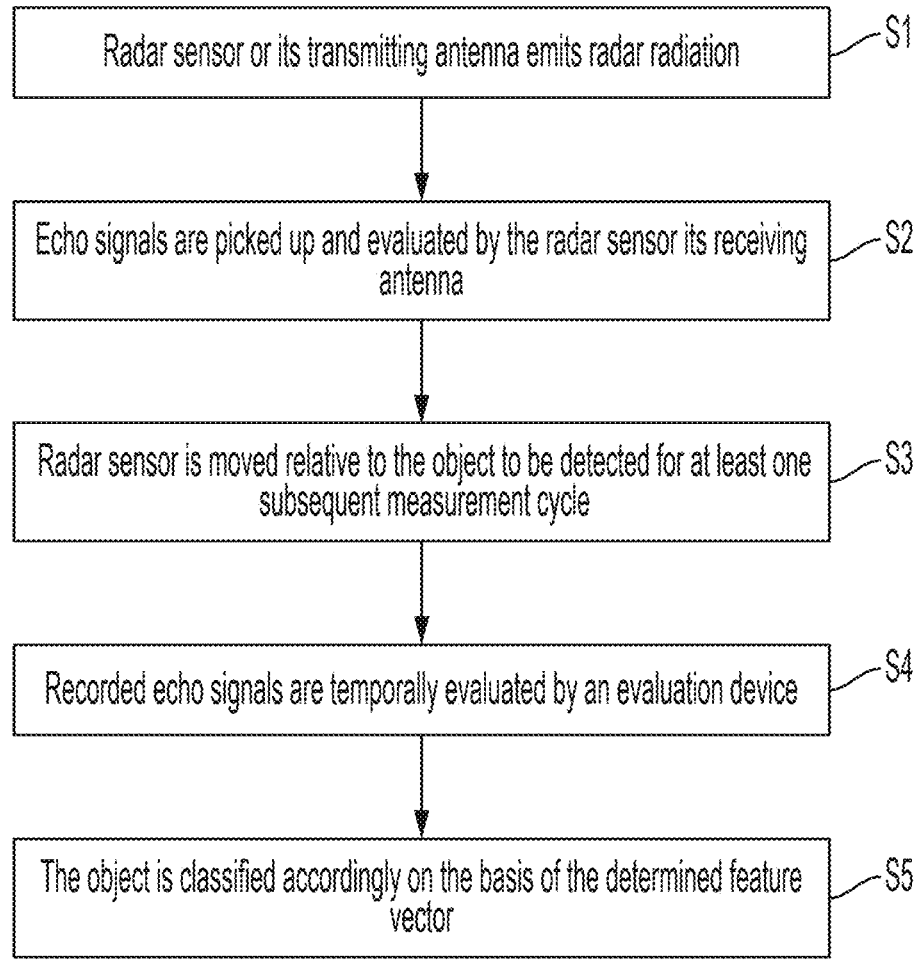
FIG. 1 is a flow chart of a method according to the invention for detecting and classifying objects detected by using radar beams.

The accompanying figures are intended to provide a further understanding of embodiments of the invention.

They illustrate embodiments and, in connection with the description, serve to explain principles and concepts of the invention. Further embodiments and many of the advantages mentioned will be apparent when taken in reference to the figures. The elements of the figures are not necessarily shown to scale with respect to each other.

In the figures, identical, functionally identical and identically acting elements, features and components are—unless otherwise stated—each provided with the same reference numerals.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known method and device, in which several radar sensors are employed in order to classify obstacles, are described, for example, in DE 102 42 808 B4. DE 102 42 808 B4 describes distinguishing between at least two types of objects, i.e. a more point-like object from a more planar object, by use of a radar sensor with very high spatial resolution or alternatively several radar sensors.

FIG. 1 shows a flow chart of a method according to the invention for detecting and classifying objects detected by means of radar beams in the surroundings of a door or cover of a vehicle. For these purposes, a single, mobile radar sensor and an evaluation device are provided. In order to provide mobility to the radar sensor, the radar sensor is integrated in a vehicle door, for example in a door handle or a side mirror 29.

In a first step S1, the radar sensor or its transmitting antenna emits radar radiation, for example a pulsed HF signal, in the direction of an object to be detected. The radar sensor may be an FMCW (frequency modulated continuous wave) radar unit, although a pulse radar or other modulation methods are also conceivable.

In a subsequent step S2, echo signals are picked up by the radar sensor or its receiving antenna, and are evaluated accordingly. The echo signals are generated by reflection of the radar signal on a surface of the object.

Then, in the subsequent step S3, the radar sensor is moved relative to the object to be detected for at least one subsequent measurement cycle, for example by opening the door. Subsequently, the two steps S1, S2 are carried out again. The iteration loop of steps S1 to S3 may be run through several times.

By means of steps S1, S2, a differential angle with respect to the object and, due to the known distance of the transmitting and receiving antenna, the point in space, and thus also the angle of the object with respect to the radar sensor or the vehicle may be determined.

The radar sensor may be a so-called FMCW radar sensor. When using FMCW, the distance is determined by a Fast Fourier Transformation (FFT). A second FFT makes it then possible to determine the speed. Upon comparison of the phases of the combinable receiving and transmitting antennas, the azimuth angle may be determined for a given distance/velocity combination, and, if the antenna array is two-dimensional, the elevation angle may also be determined.

By means of an evaluation device, the recorded echo signals are temporally evaluated during step S4 using statistical procedures and methods. Based on the information thus obtained, a feature vector is calculated. The feature vector contains various numeric parameters which are extracted from the evaluated echo signals, which parameters characterize the characteristic properties of the object to be detected.

Finally, in step S5, the object is classified accordingly on the basis of the feature vector determined in this way. In this classification, it is at least determined whether the object to be detected is an ideal pole or an ideal wall. Optionally, a classification may also be made in such a way that the object is neither an ideal pole nor an ideal wall.

Figure 2:
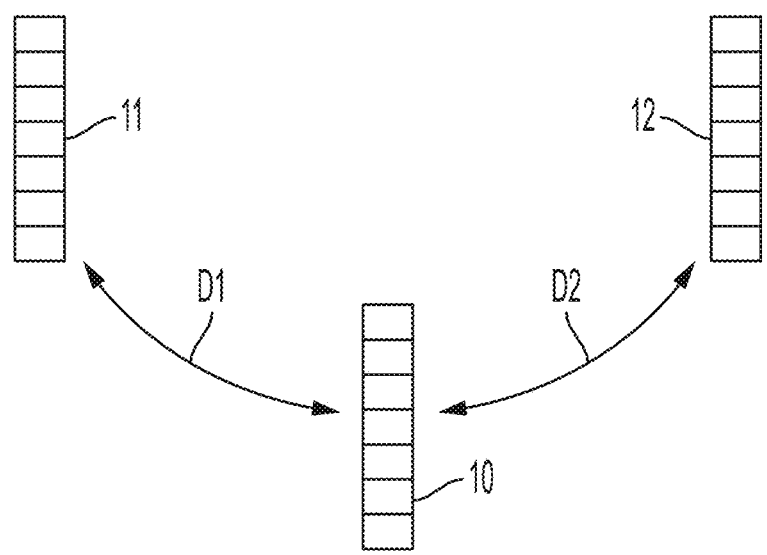
FIG. 2 is a schematic representation explaining the classification process in shown FIG. 1.

FIG. 2 shows an illustration for explaining the classification process according to steps S4 and S5 shown in FIG. 1.

In FIG. 2, reference numeral 10 denotes a feature vector determined by measurement. The feature vector 10 has been obtained by evaluation from the recorded echo signals according to step S4. This feature vector 10 contains various contents (or features) depending on the application and system settings, such as the statistical evaluation of the angle information, distance travelled, resolution and accuracy of the measurement, duration of a measurement cycle, etc. The feature vector 10 may also be employed for other purposes. Statistical methods for the temporal analysis of the information include the median, mean, variance, temporal maximum and minimum, or the calculation of these parameters by limitation to a fixed number of measurements in the past (sliding window), etc.

In order to perform the classification in step S5, a first feature vector 11 and a second feature vector 12 are then provided. The two feature vectors 11, 12 have been calculated empirically, wherein the first feature vector 11 represents an ideal pole, and the second feature vector 12 represents an ideal wall. In order to perform the classification in step S5, a distance between the feature vector 10 and the two feature vectors 11, 12 is then calculated, for example by determining a first weighted Euclidean distance D1 between the feature vectors 10 and 11 on the one hand (for a comparison to an ideal pole), and a second weighted Euclidean distance D2 between the feature vectors 10 and 12 on the other hand (for a comparison to an ideal wall). If D1>D2, then it is assumed that the object to be detected has more in common with a wall, and is therefore classified as a wall. If, on the other hand, D1<D2, then it is assumed that the object to be detected has more in common with a pole, and is therefore classified as a pole. The comparison of the vectors is not limited to the Euclidean distance as an evaluation criterion.

If the calculated distances D1, D2 are too large, i.e. if D1>Dmax and at the same time D2>Dmax, then it must be assumed that the object to be detected is neither a wall nor a pole, but is rather a diffuse object that cannot be detected exactly, such as in the case of a wire mesh fence, a bush, a hedge, a plant or the like. In this case, there is no classification, but at least an indication that the object cannot be mapped in a two-class classification.

In addition, a weighting factor may be provided which allows a tendency towards one of the two classes.

Figure 3:
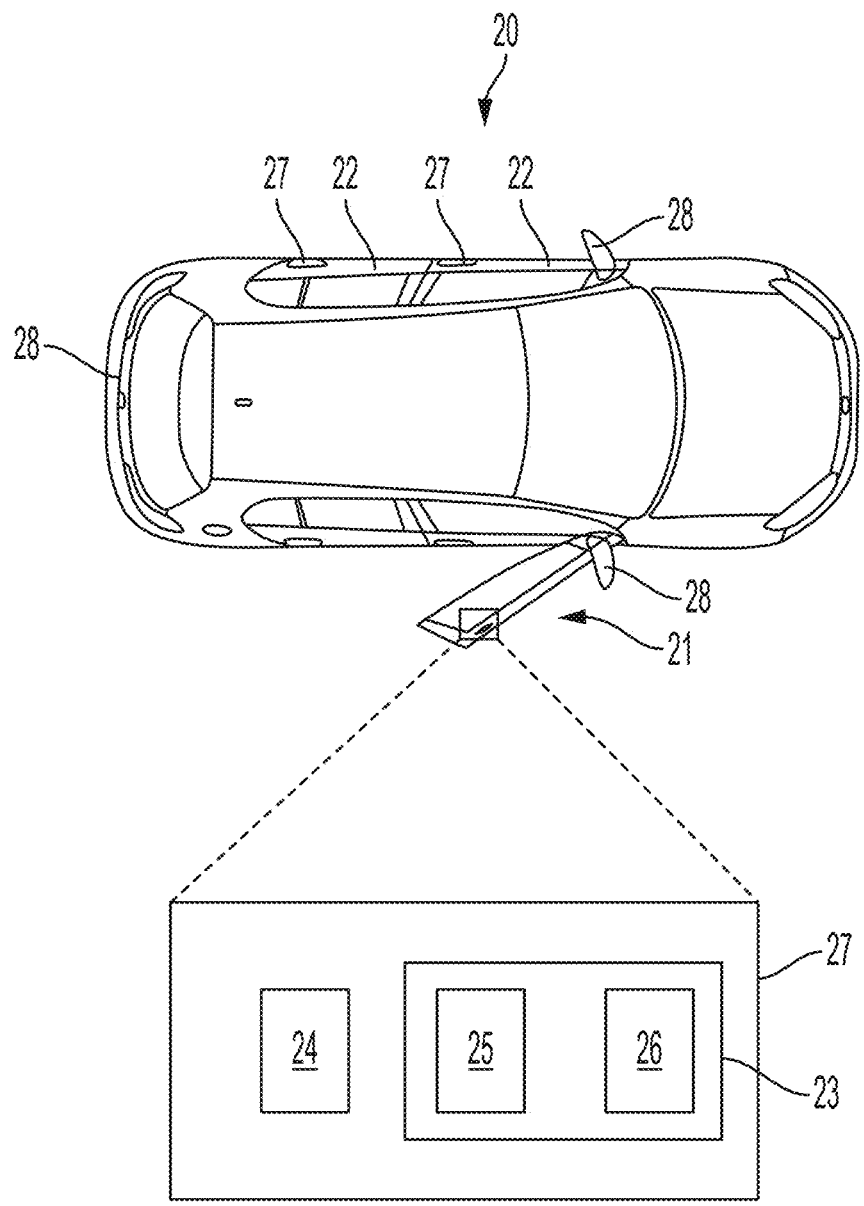
FIG. 3 is a simplified block diagram of a vehicle according to the invention.

FIG. 3 shows a simplified block diagram of a vehicle 20 according to the invention, which is equipped with one or more vehicle door systems. The vehicle door system designated by reference numeral 21 may include a door 22 and/or a cover 28, a radar sensor 23 and an evaluation device 24.

The door 22 may be a side door 22 (e.g. including a rear view camera), a sliding door or a rear door. The cover 28 may be a boot lid, a tailgate 28, a tailgate window or the like. The radar sensor 23, which is for example a MIMO radar sensor, may include a transmitting device 25 and a receiving device 26. In the example shown, the radar sensor 23 is integrated in a door handle 27, a door latch or the like.

Figure 4:
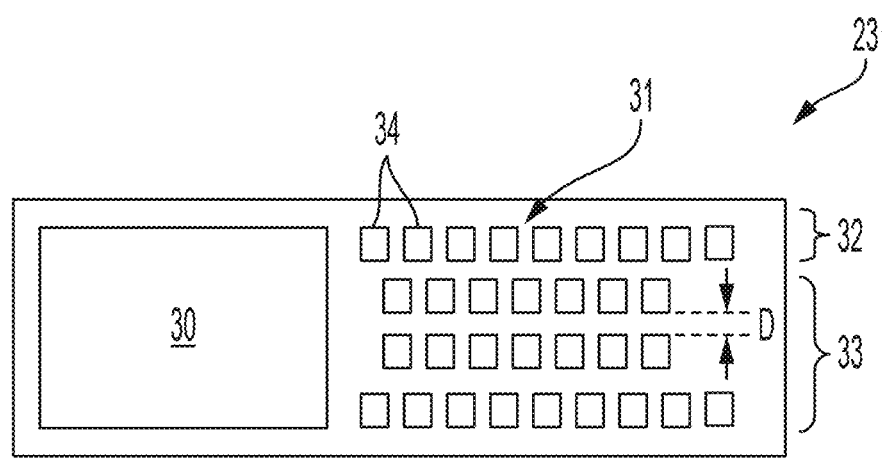
FIG. 4 is a block diagram showing an example of the implementation of the radar sensor.

FIG. 4 is a block diagram showing an example for implementing a radar sensor.

The radar sensor 23 may include at least one integrated semiconductor circuit (IC) 30 and an antenna arrangement 31. As an example, the IC 30 as well as the antenna arrangement 31 are mounted on a corresponding printed circuit board (not shown in FIG. 3). This circuit board may be elongated, and oriented, for example, in the longitudinal direction of the door handle 27.

The antenna arrangement 31 includes transmitting antennas 32 and receiving antennas 33. In one or more embodiments, the antenna arrangement 31 serves both to transmit and to receive transmitted and received radar beams. The antenna arrangement 31 may be designed in such a way that an angle measurement may be carried out in two mutually perpendicular planes, such as an angle measurement in azimuth and elevation. For this purpose, the antenna arrangement 31, as shown in FIG. 4, may have antenna elements 34 arranged in a matrix-like manner in two mutually perpendicular directions, which may be implemented as microstrip patches, for example. However, the antenna elements 31 do not necessarily have to be arranged perpendicular to each other, but may also be arranged in a different more or less ordered arrangement. The spacings 35 of the antenna elements 34 are known, and should correspond to at least half the wavelength ($\lambda/2$) of the radar radiation. This allows angular resolution in both azimuth and elevation, provided the antenna arrangement 31 is appropriately aligned within the door handle 13.

As an example, IC 30 may include the radar transceiver of the radar sensor 23, a digital signal processing (DSP) component and a control device of the radar sensor. In addition, IC 30, which may be designed as a CMOS circuit, typically includes further components, such as a filter, a power IC, a memory device (such as a flash memory) and an interface for coupling the radar sensor 23 to a bus system of the motor vehicle.

The radar sensor 23 serves the purpose of emitting radar beams by means of the antenna arrangement 31. If there is an object in the surroundings of this radar sensor 23, at least part of the radiation emitted by the radar sensor 23 is reflected by this object, and may be picked up as echo radiation by means of the antenna arrangement 31. The echo radiation recorded in this way is pre-processed accordingly in IC 30.

The functionality of the evaluation device 24 may, for example, be performed by a corresponding control unit for the respective side door, or may be performed by a central control unit of the vehicle. The evaluation device 24 may also be implemented in a program-controlled device, such as a microcomputer, microprocessor, and so on.

The method according to the present disclosure, as explained above with reference to FIGS. 1 to 2, is primarily carried out by the radar sensor 23 and by the evaluation device 24, whereas the radar sensor 23 primarily carries out the process steps S1, S2, and whereas the evaluation device 24 primarily carries out the process steps S3, S4, S5.

Although the present disclosure has been fully described above on the basis of preferred exemplary embodiments, the present invention is not limited thereto, but can be modified in a variety of ways.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

10 Feature vector determined by measurement
11 First feature vector for an ideal pole
12 Second feature vector for an ideal wall
20 Vehicle
21 Vehicle door system
22 Door
23 Radar sensor
24 Evaluation device
25 Transmitting device
26 Receiving device
27 Door handle
28 Cover
29 Exterior mirror
30 Semiconductor circuit, IC
31 Antenna arrangement
32 Transmitting antennas
33 Receiving antennas
34 Antenna elements
D1 Weighted Euclidean distance for comparison with an ideal pole
D2 Weighted Euclidean distance for comparison with an ideal wall
S1-S5 Process steps
D Distance While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method of detecting and classifying an object disposed in surroundings of a motor vehicle, the method comprising:
   emitting, by a sensor disposed in or on the motor vehicle and configured to detect the object, active radiation, wherein the sensor is a component of a vehicle door;
   classifying with regard to a spatial extent of the object, including,
   moving the sensor relative to the object from one measurement cycle to at least one subsequent measurement cycle, and
   recording echo signals reflected from the object during the one measurement cycle and the at least one subsequent measurement cycle, and
   statistically evaluating information contained in the recorded echo signals,
   wherein the moving step is accomplished by performing an opening or closing process of the vehicle door.

2. The method of claim 1, wherein the sensor is a single sensor.

3. The method of claim 1, wherein the sensor is a lidar sensor or an ultrasonic sensor.

4. The method of claim 1, further comprising:
determining a feature vector from the information contained in the recorded echo signals, and the feature vector is employed for the statistically evaluating step and the classifying step.

5. The method of claim 4, wherein the classifying step includes comparing the determined feature vector with a first feature vector for an ideal pole and a second feature vector for an ideal wall, and classifying the object as a wall or as a pole depending on the comparing step.

6. The method of claim 5, wherein the comparing step includes determining distances between the determined feature vector and the first feature vector and between the determined feature vector and the second feature vector, wherein the object is selected as a classified object based on a distance of the distance which is smallest.

7. The method of claim 6, wherein the object is classified neither as an ideal pole nor as an ideal wall if the distances exceed a predetermined distance.

8. The method of claim 6, further comprising:
calculating a Euclidean distance after the determining step.

9. The method of claim 6, further comprising:
calculating a weighted Euclidean distance after the determining step.

10. The method of claim 4, wherein the determining step includes determining at least one of:
a differential angle;
a maximum angle of change;
a total distance travelled during the measurement cycles averaged over a time required thereof;
a differential path from the one measurement cycle to the at least one subsequent measurement cycle; and
a maximum change of a phase angle.

11. The method of claim 1, further comprising:
using a tracking algorithm to track the object over time.

12. The method of claim 1, further comprising:
detecting the surroundings, wherein the sensor is a component of a vehicle door, and the detecting the surroundings step includes performing an opening process of the vehicle door, and outputting a warning signal if an imminent collision of the vehicle door with the object is detected based on the detecting the surroundings step.

13. The method of claim 1, wherein the sensor is a component of a vehicle door, and the moving step is accomplished by a motorized opening and/or closing process of the vehicle door.

14. A method of detecting and classifying objects disposed in surroundings of a motor vehicle, the method comprising:
emitting active radiation by a sensor during a plurality of successive measurement cycles;
recording echo radiation reflected by the object;
moving the sensor relative to the object after each measurement cycle of the plurality of successive measurement cycles;
evaluating the recorded echo radiation recorded during each measurement cycle by statistical methods; and
classifying the object based on the evaluating step.

15. A motor vehicle provided with at least one vehicle door, the motor vehicle comprising:
at least one vehicle door;
at least one sensor device including a radar sensor, the radar sensor configured to emit active radiation during a plurality of successive measurement cycles, during which the radar sensor is moved relative to an object after each measurement cycle of the plurality of successive measurement cycles, wherein the radar sensor is a component of the vehicle door and wherein the moving is accomplished by performing an opening or closing process of the vehicle door; and
an evaluation device configured to
evaluate, by statistical methods, recorded echo radiation reflected by the object and recorded for each measurement cycle of the plurality of successive measurement cycles, and
classify the object based on the statistical methods.

16. The motor vehicle of claim 15, wherein the radar sensor is installed in a door handle and/or behind a cover.

17. The motor vehicle of claim 15, further comprising:
an electric drive configured to automatically open or close the vehicle door.

18. The motor vehicle of claim 15, wherein the sensor is a radar-emitting radar sensor.

19. The motor vehicle of claim 15, wherein the sensor is an FMCW radar sensor.

20. A method of detecting and classifying an object disposed in surroundings of a motor vehicle, the method comprising:
emitting, by a sensor disposed in or on the motor vehicle and configured to detect the object, active radiation;
classifying with regard to a spatial extent of the object, including,
moving the sensor relative to the object from one measurement cycle to at least one subsequent measurement cycle, and
recording echo signals reflected from the object during the one measurement cycle and the at least one subsequent measurement cycle, and
statistically evaluating information contained in the recorded echo signals,
determining a feature vector from the information contained in the recorded echo signals, and the feature vector is employed for the statistically evaluating step and the classifying step,
wherein the classifying step includes comparing the determined feature vector with a first feature vector for an ideal pole and a second feature vector for an ideal wall, and classifying the object as a wall or as a pole depending on the comparing step.

* * * * *